United States Patent [19]

Satoh

[11] Patent Number: 5,729,062
[45] Date of Patent: Mar. 17, 1998

[54] ACTIVE PLUG-IN CIRCUIT

[75] Inventor: Shunji Satoh, Tokyo, Japan

[73] Assignee: NEC Corporation, Tokyo, Japan

[21] Appl. No.: 693,504

[22] Filed: Aug. 7, 1996

[30]     Foreign Application Priority Data

Aug. 9, 1995   [JP]   Japan .................. 7-202643

[51] Int. Cl.⁶ ............................................. H01H 35/00
[52] U.S. Cl. ...................... 307/130; 307/125; 323/908;
                                                361/58; 361/111; 364/707
[58] Field of Search ............................ 307/130, 125;
                                         323/908; 361/58, 111; 364/707

[56]             References Cited

U.S. PATENT DOCUMENTS 4,079,440  3/1978  Ohnuma et al. ................... 361/816
4,538,073  8/1985  Freige et al. ....................... 307/33
5,010,293  4/1991  Ellersick ............................. 323/278
5,374,887  12/1994 Drobnik .............................. 323/299
5,572,395  11/1996 Rasums et al. ....................... 361/58

*Primary Examiner*—William M. Shoop, Jr.
*Assistant Examiner*—Albert W. Paladini
*Attorney, Agent, or Firm*—Sughrue, Mion, Zinn, Macpeak & Seas, PLLC

[57]               ABSTRACT

In an active plug-in circuit, a mode setting section sets either a plug-in mode or a regular mode, depending on the power source voltage of a package. When the plug-in mode is set, a power consumption controller maintains an electronic circuit built in the package in a low power consumption mode. After the power source voltage of the electronic circuit has been stabilized, the mode setting section sets the regular mode. The circuit reduces the variation of power source current to occur when a power source pin mounted on a package connector is connected to the corresponding terminal of a mother board connector and on the transition from the plug-in mode to the regular mode.

10 Claims, 9 Drawing Sheets

ACTIVE PLUG-IN CIRCUIT

BACKGROUND OF THE INVENTION

The present invention relates to an active plug-in circuit and, more particularly, to an active plug-in circuit allowing a package mounted on an active or on-line apparatus to be replaced or extended.

A conventional active plug-in circuit has a package connector while a mother board has a mother board connector. To connect the package to the mother board, the package connector is connected to the mother board connector. A power source included in the mother board feeds power to the package via power source lines also included in the mother board and a power source pin and a ground pin (power return) mounted on the package connector.

The problem with the conventional active plug-in circuit is that a great power source current flows on the connection of the power source pin of the package connector to the terminal of the mother board connector during the transition from the plug-in mode to the regular mode.

SUMMARY OF THE INVENTION

It is therefore an object of the present invention to provide an active plug-in circuit capable of reducing the variation of a power source current occuring when the power source pin of a package connector is connected to the corresponding terminal of a mother board connector during the transition from a plug-in mode to a regular mode.

In accordance with the present invention, an active plug-in circuit for allowing a package to be plugged in an active apparatus has a mode setting section for setting either a plug-in mode or a regular mode, depending on the power source voltage of the package. A power consumption controller maintains an electronic circuit built in the package in a low power consumption mode when the mode setting section sets the plug-in mode. A resistor is connected between a power source pin of a connector of the package and a power source terminal of the electronic circuit. A switch short-circuits the resistor when the mode setting section sets the regular mode.

Also, in accordance with the present invention, an active plug-in circuit for allowing a package to be plugged in an active apparatus has a mode setting pin mounted on a connector of the package and connected to a corresponding pin of a connector of the apparatus after a power source pin of the connector of the package has been connected to a corresponding pin of the connector of the apparatus. A regular mode signal of the package is input to the mode setting pin. A power consumption controller maintains an electronic circuit built in the package in a low power consumption mode until the regular mode signal has been input from the mode setting pin. A resistor is connected between the power source pin and a power source terminal of the electronic circuit. A switch short-circuits the resistor when the regular mode signal is input from the mode setting pin.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
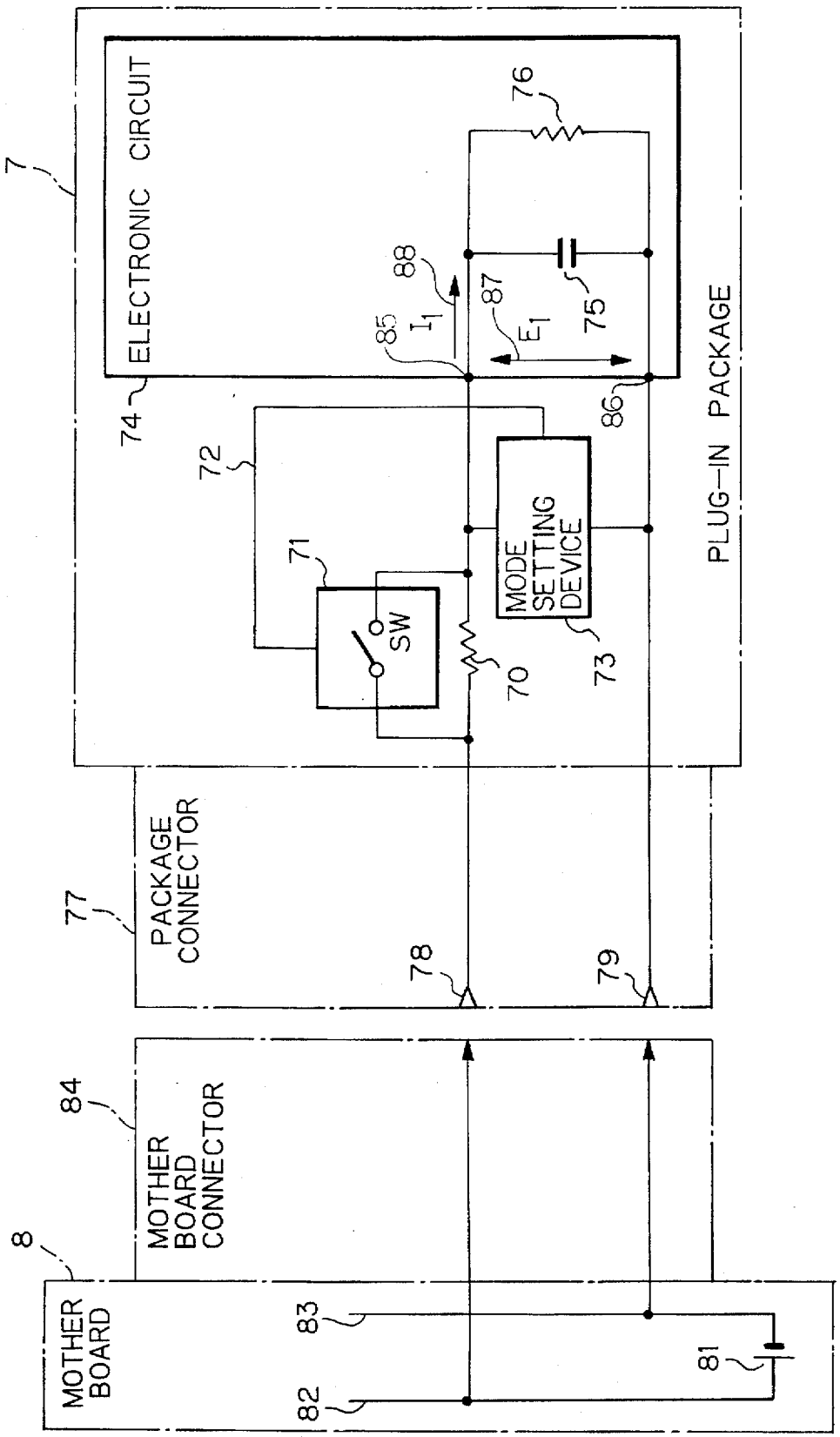
FIG. 1 is a block diagram schematically showing a conventional active plug-in circuit.

To better understand the present invention, a brief reference will be made to a conventional active plug-in circuit, shown in FIG. 1. As shown, a plug-in package or module 7 has a package connector 77 while a mother board 8 has a mother board connector 84. To connect the package 7 to the mother board 8, the package connector 77 is connected to the mother board connector 84. A power source 81 included in the mother board 8 feeds power to the package 7 via power source lines 82 and 83 also included in the mother board 8 and a power source pin 78 and a ground pin (power return) 79 mounted on the package connector 77.

The package 7 has an electronic circuit 74 consisting of a capacitor 75 and a resistor 76. The capacitor 75 and resistor 76 are respectively the total electrostatic capacity and the total load resistance of the electronic circuit 74. A mode setting device 73 feeds a mode signal to a switch 71 via a mode signal line 72, thereby causing it to selectively operate in a particular mode. The resistor 70 limits a current to flow into the package 7 at the moment when the power source pin 78 and ground pin 79 are connected to the corresponding terminals of the mother board connector 84. If the resistor 70 is absent, then a great rush current will flow to the terminals of the mother board connector 84 at the above moment. The rush current is apt to damage the pins 78 and 79 of the package connector 77 or to cause the power source of the electronic circuit 74 to vary.

The mode setting device 73 monitors a power source voltage. When the power source voltage is lower than a preselected value, the mode setting device 73 sends a plug-in mode signal to the switch 71 via the mode signal line 72, thereby opening the switch 71. When the power source voltage is higher than the preselected value, the mode setting device 73 sends a regular mode signal to the switch 71 via the line 72 in order to close it. In the closed position, the switch 71 prevents the voltage from being lowered by the resistor 70 during regular mode operation.

Figure 2:
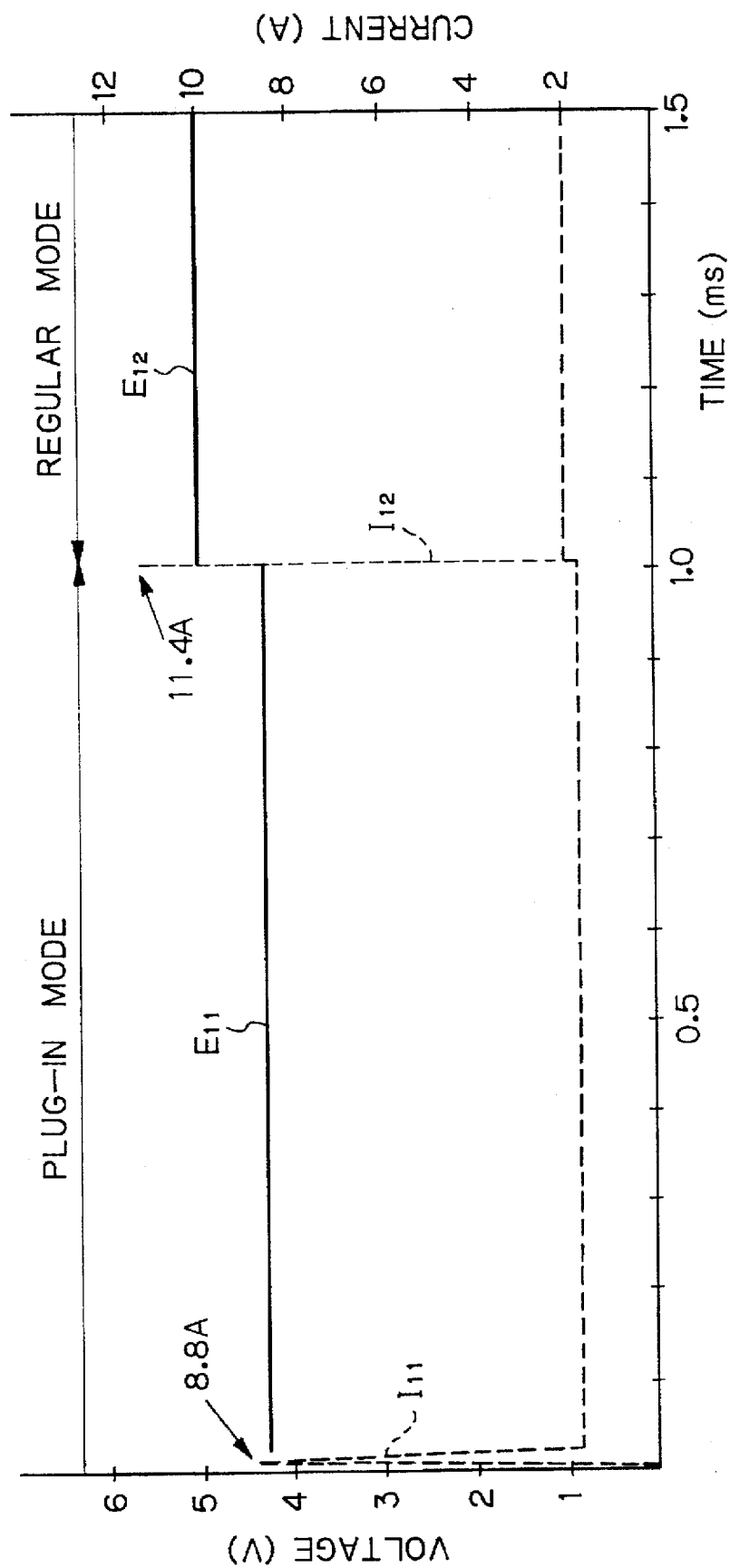
FIG. 2 shows specific variations of power source voltage and power source current to occur on the transition from a plug-in mode to a regular mode in the conventional circuit and determined by simulation.

FIG. 2 shows the power source voltage $E_1$ or 87 between terminals 85 and 86 and power source current $I_1$ or 88 to appear in the electronic circuit 74 on the transition from the plug-in mode to the regular mode, as determined by simulation. The simulation was effected under the following conditions:

| | |
|---|---|
| voltage of power source 81 | 5 V |
| power consumption of package 7 | 10 W |
| resistance of resistor 76 | 2.5 Ω |
| resistance of wiring and connector | 50 mΩ |
| inductance of wiring and connector | 20 nH |

| | |
|---|---|
| allowable rush current | about 10 A |
| resistance of resistor 70 | 0.5 Ω |

When the active plug-in circuit is in the plug-in mode, the power source voltage E11 of the electronic circuit 74 does not increase to above the voltage division ratio between the resistors 70 and 76. As a result, on the transition from the plug-in mode to the regular mode, the power source voltage E11 sharply increases to E12 stepwise, as shown in FIG. 2. At this instant, a current I12 as great as 11.4 A in FIG. 2 flows into the power source pin 78 of the package connector. Further, when the power source pin 78 is connected to the terminal of the mother board connector 84, a current I11 flows into the pin 78 and is shown as being 8.8 A in FIG. 2. This current I11 is determined by the resistor 70.

The resistance of the resistor 70 is determined by the above two factors. Specifically, the resistance of the resistor 70 is preselected such that the current I11 to flow on the connection of the power source pin 78 to the mother board connector 84 and the current I12 to flow on the transition from the plug-in mode to the regular mode are equal to each other.

However, the problem with the conventional active plug-in circuit is that a great power source current flows on the connection of the power source pin 82 of the package connector 77 to the terminal of the mother board connector 84 and on the transition from the plug-in mode to the regular mode.

Figure 3:
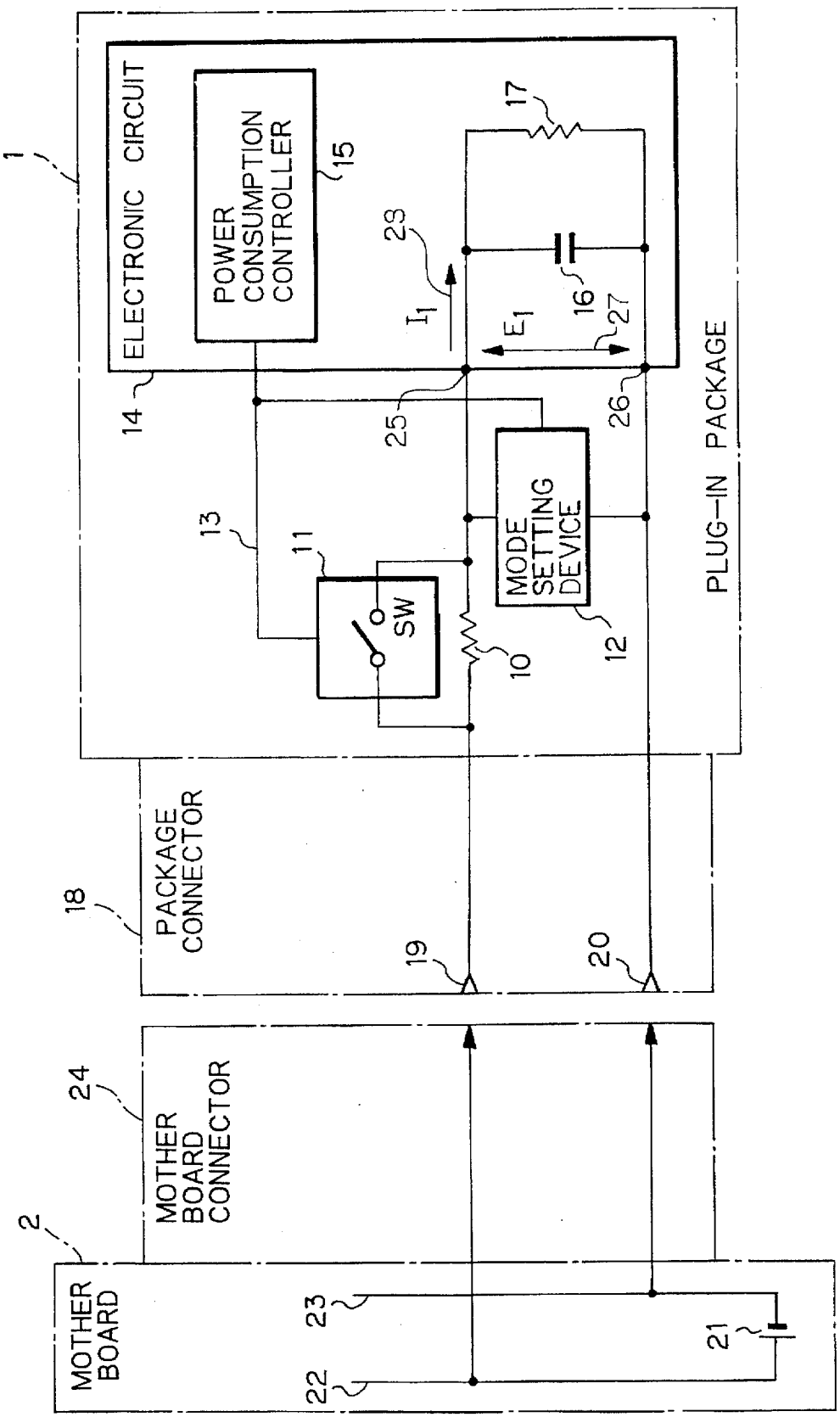
FIG. 3 is a block diagram schematically showing an active plug-in circuit embodying the present invention.

Referring to FIG. 3, an active plug-in circuit embodying the present invention will be described. As shown, the plug-in circuit has a resistor 10, a switch 11, a mode setting device 12, and a power consumption controller 15. When the power source voltage of an electronic circuit 14 is lower than a preselected value, the mode setting device 12 sends a plug-in mode signal to the switch 11 via a mode signal line 13. When the former is higher than the latter, the mode setting device 12 sends a regular mode signal to the switch 11 via the line 13. The plug-in mode signal and the regular mode signal respectively open and close the switch 11. The plug-in mode signal and regular mode signal are fed to the power consumption controller 15 also. In response to the plug-in mode signal, the controller 15 reduces the power consumption of the electronic circuit 14, as will be described in detail later.

Figure 4:
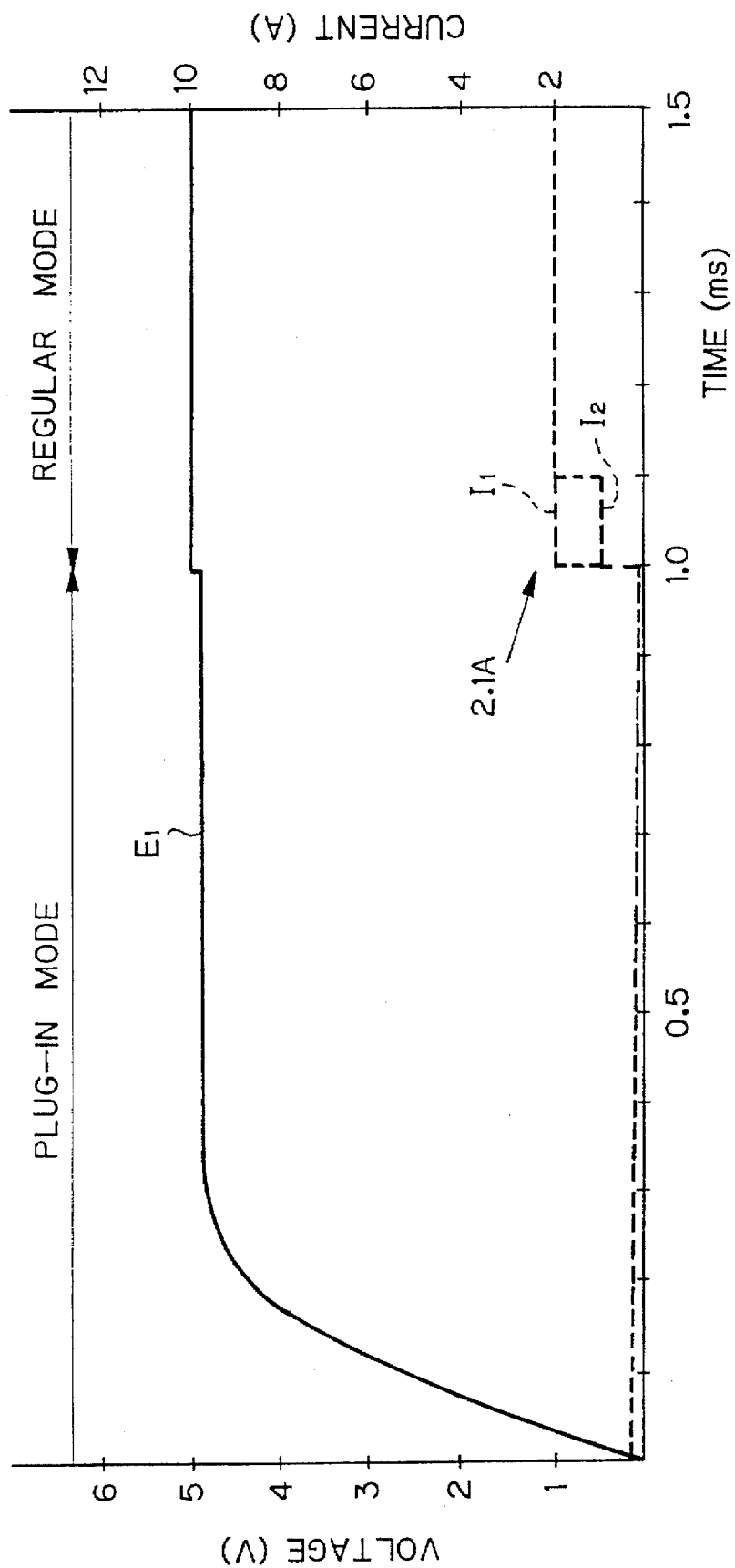
FIG. 4 shows specific variations of power source voltage and power source current to occur on the transition from a plug-in mode to a regular mode in the embodiment of FIG. 3 and also determined by simulation.

FIG. 4 shows the power source voltage $E_1$ or 27 between terminals 25 and 26 and power source current $I_1$ or 28 to appear in the electronic circuit 14 on the transition from the plug-in mode to the regular mode, as also determined by simulation. The operation of the embodiment will be described with reference to FIGS. 3 and 4.

The above simulation was effected under the following conditions:

| | |
|---|---|
| voltage of power source 21 | 5 V |
| power consumption of package 1 (regular mode) | 10 W |
| power consumption of package 1 (plug-in mode) | 25 mW |
| resistance of resistor 17 (plug-in mode) | 2.5 Ω |
| resistance of resistor 17 (plug-in mode) | 1 kΩ |
| resistance of wiring and connector | 50 mΩ |
| inductance of wiring and connector | 20 nH |
| allowable rush current | about 10 A |
| time up to voltage stabilization | about 1 ms |
| resistance of resistor 10 | 10 Ω |

The resistor 10 has its resistance preselected such that it is smaller than the resistance of the resistor 17 in the plug-in mode, and the time up to the stabilization of the power source voltage of the electronic circuit 14 is satisfied. This successfully reduces the rush current to below the allowable value when a power source pin 19 is connected to a mother board connector 24.

When the power source pin 19 of the plug-in package 1 is connected to the terminal of the mother board connector 24, a rush current is limited by the resistor 10. Specifically, the rush current is 0.5 A as produced by dividing the power source voltage of 5 V by the resistance of the resistor 10. In the plug-in mode, the resistance of the resistor 10 is lower than that of the resistor 17 because the power consumption controller 15 sets up a low power consumption mode in the electronic circuit 14. As a result, the power source voltage E1 of the electronic circuit 14 rises substantially with the time constant of the resistor 10 and capacitor 16. The mode setting device 12 monitors the power source voltage E1 of the electronic circuit 14 and feeds the regular mode signal to the switch 11 via the signal line 13 when the voltage E1 is substantially stabilized.

In the specific case shown in FIG. 4, the operation mode is switched from the plug-in mode to the regular mode in 1.0 ms after the connection of the power source pin 19. Although the power source voltage E1 of the electronic circuit 14 slightly varies at the time of mode switching, the variation is far smaller than in the conventional active plug-in circuit. Further, although the power source current I1 varies from substantially zero to the current to be consumed in the regular mode, the variation is also far smaller than in the conventional active plug-in circuit.

Figure 5:
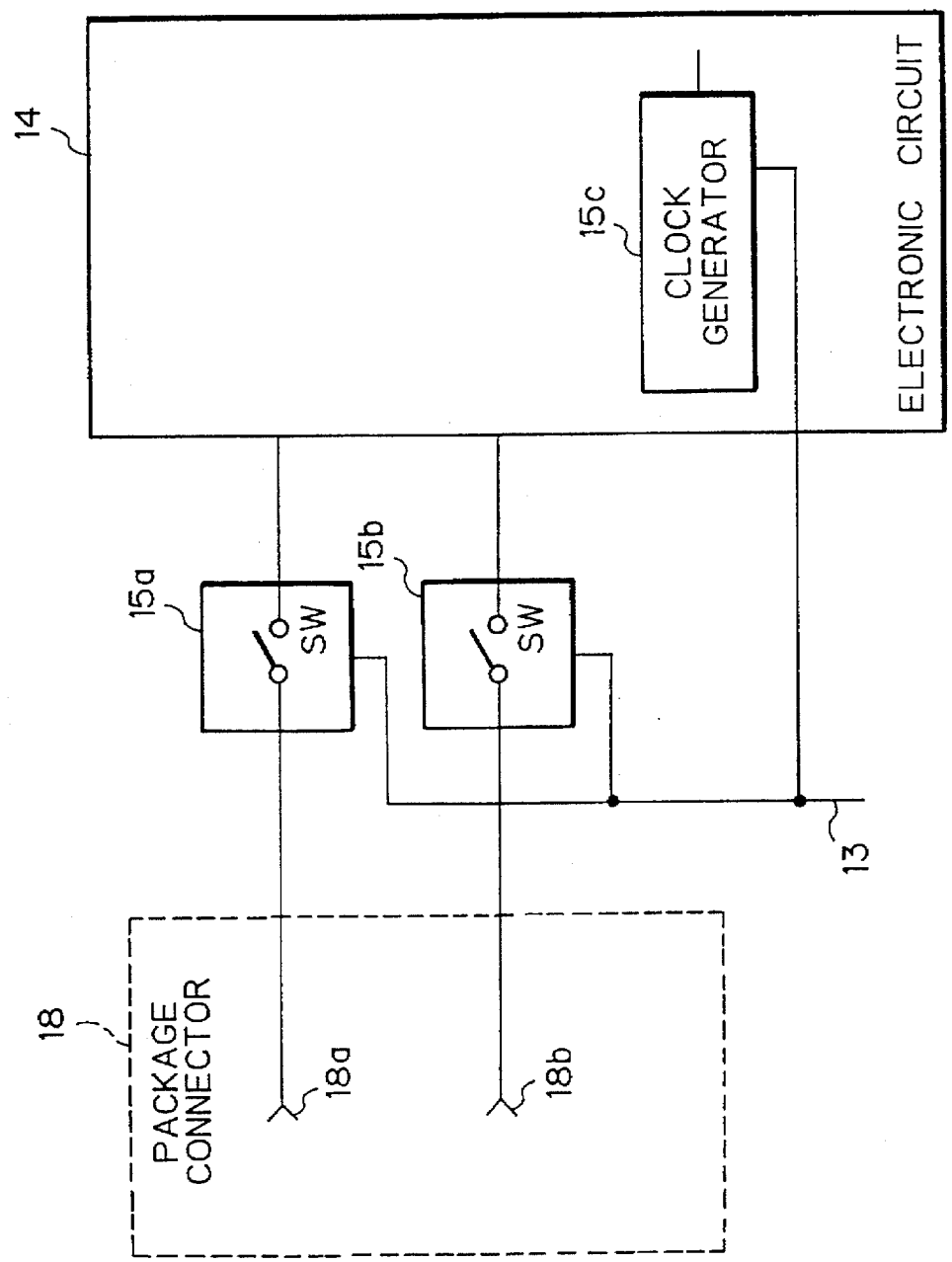
FIGS. 5 and 6A–6C each shows a specific configuration for maintaining an electronic circuit included in the embodiment in a low power consumption state.

FIG. 5 shows a specific arrangement for setting up the low power consumption mode in the electronic circuit 14. As shown, the package connector 18 has a clock terminal 18a and a data terminal 18b for respectively inputting a clock and data to the electronic circuit 14. The clock terminal 18a and data terminal 18b are connected to the electronic circuit via switches 15a and 15b, respectively. The plug-in mode signal output to the mode signal line 13 from the mode setting device 12 opens the switches 15a and 15b. In this condition, the clock and data signals input to the terminals 18a and 18b, respectively, are not delivered to the electronic circuit 14. A clock generator 15c included in the electronic circuit 14 is also disenabled by the plug-in mode signal.

Generally, the power consumption of a CMOS (Complementary Metal Oxide Semiconductor) IC (Integrated Circuit) increases in proportion to a switching frequency. Therefore, the electronic circuit 14 including a CMOS IC can be switched to the low power consumption mode if the delivery of the clock and signal to the CMOS IC is interrupted.

Figure 6A:
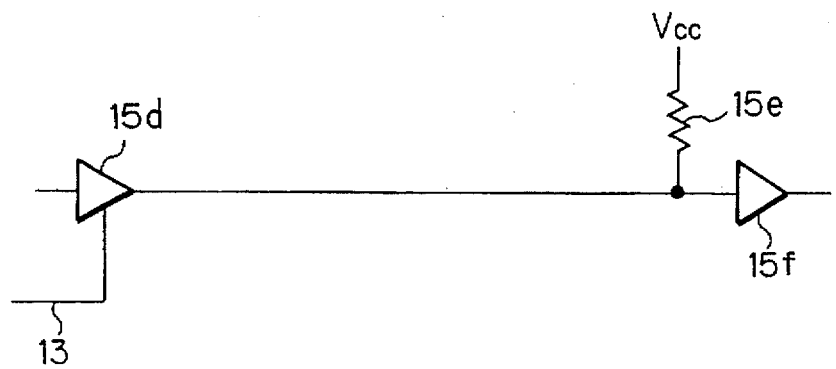
Figure 6B:
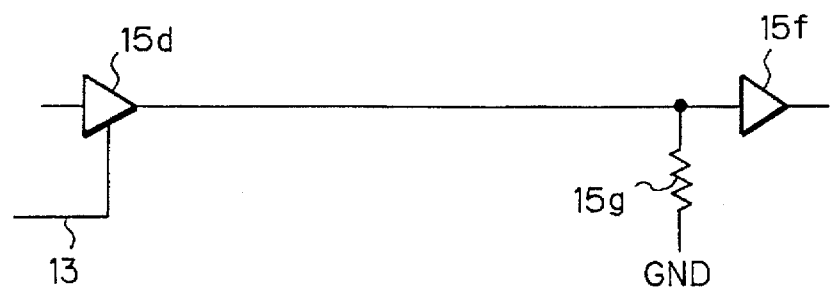
Figure 6C:
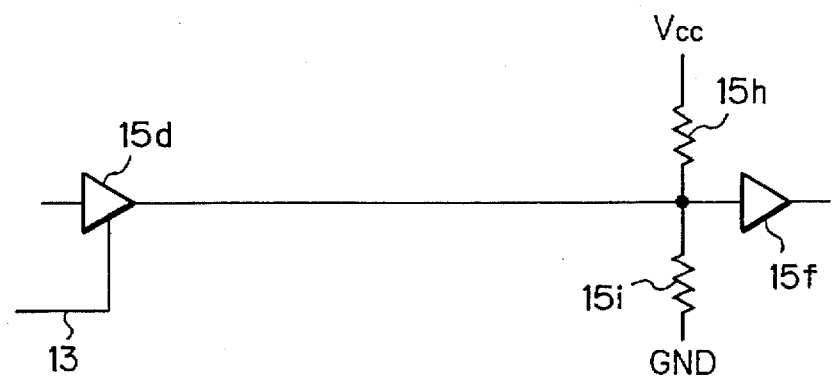

FIGS. 6A–6C each show another specific implementation for switching the electronic circuit 14 to the low power consumption mode. In FIG. 6A, use is made of a pull-up resistor 15e. When the output of a driver 15d is in its low level, a current flows from the pull-up resistor 15e to the output of the driver 15d. The output of the driver 15d is controlled by the signal appearing on the mode signal line 13 such that it becomes high level or high impedance. As a result, the current flowing from the pull-up resistor 15e to the output of the driver 15d is interrupted.

In FIG. 6B, use is made of a pull-down resistor 15g. In this configuration, the low power consumption mode can be set up if the output of the driver 15d is brought to its low level or high impedance. In FIG. 6C, a pull-up resistor 15h and a pull-down resistor 15i are arranged such that the low power consumption mode is set up when the output level of the driver 15d goes down.

Figure 7:
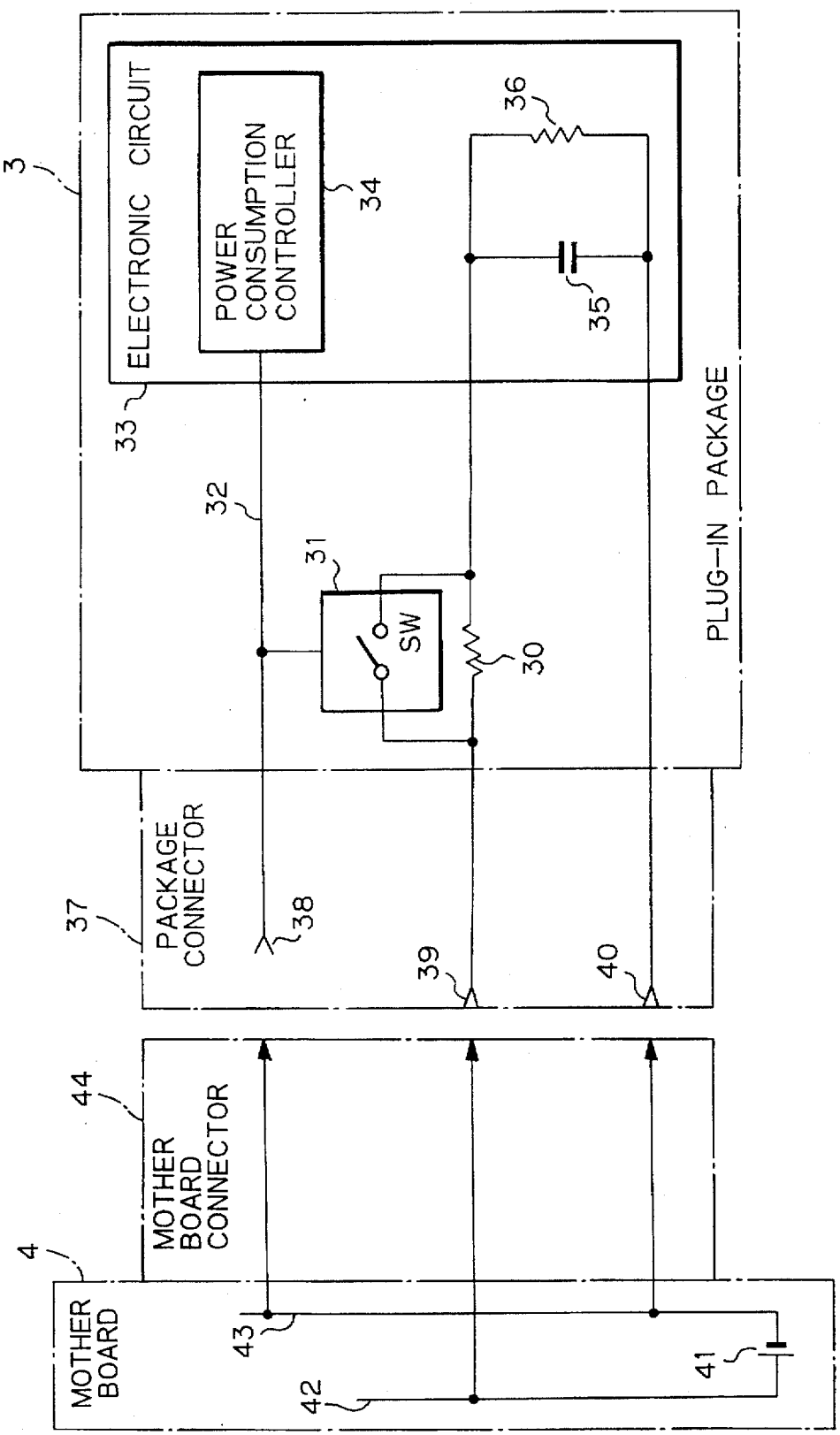
FIGS. 7, 8 and 9 each shows an alternative embodiment of the present invention.

Referring to FIG. 7, an alternative embodiment of the present invention is shown. As shown, the active plug-in circuit has a resistor 30, a switch 31, a power consumption controller 34, and a pin 38 for mode setting. The pin 38 is included in a package connector 37 to play the same role as the mode setting 12 of the previous embodiment. The pin 38 is connected to a mother board connector 44 later than a power source pin 39 and a ground pin 40 also mounted on the package connector 37. The interval between the time when the power source pin 39 and ground pin 40 are connected to the terminals of a mother board connector 44 and the time when the pin 39 is connected to the terminal of the mother board connector 44 is preselected to be longer than a period of time necessary for the power source voltage of an electronic circuit 33 to be substantially stabilized.

The switch 31 is held open until a regular mode signal is output to a mode signal line 32 from the pin 38. The regular mode signal causes the switch 31 to close. A power consumption controller 34 maintains an electronic circuit 33 in the low power consumption mode until the regular mode signal appears on the mode signal line 32.

The resistor 30 limits a rush current to flow when the power source pin 39 of the package connector is connected to the terminal of the mother board connector 44. In the plug-in mode, i.e., until the regular mode signal appears on the mode signal line 32, the power consumption controller 33 maintains the electronic circuit 33 in the low power consumption mode. Therefore, the resistance of the resistor 30 is lower than that of a resistor 36. As a result, the power source voltage E1 of the electronic circuit 33 rises substantially with the time constant of the resistor 30 and a capacitor 35.

Although the power source voltage of the electronic circuit 33 slightly varies at the time of mode switching, the variation is far smaller than in the conventional active plug-in circuit. Further, although the power source current varies from substantially zero to the current to be consumed in the regular mode, the variation is also far smaller than in the conventional active plug-in circuit.

Figure 8:
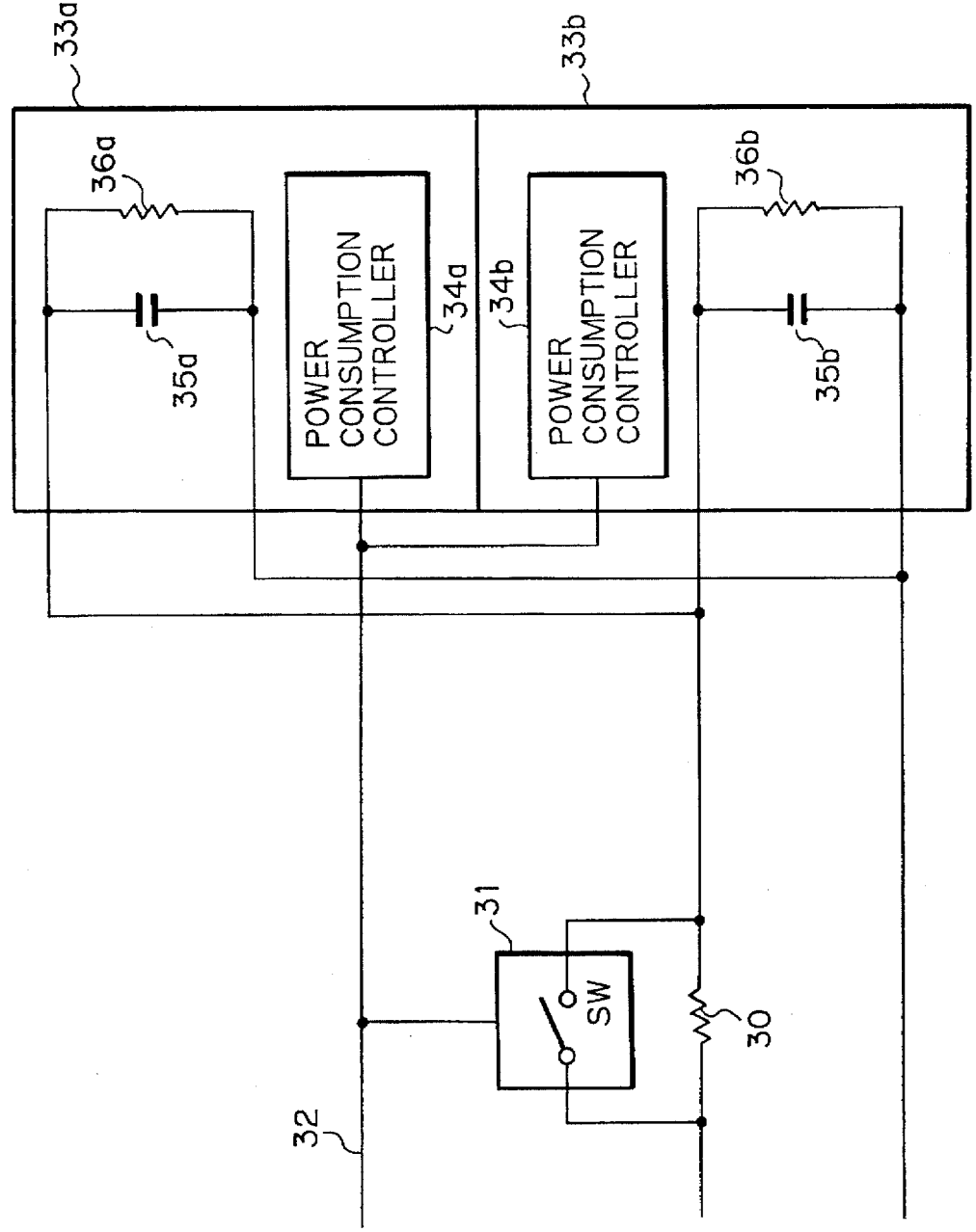

FIG. 8 shows still another alternative embodiment of the present invention. As shown, the active plug-in circuit has two electronic circuits 33a and 33b constituting the electronic circuit 33, of FIG. 7, in combination and each having a particular function. The electronic circuits 33a and 33b respectively have power consumption controllers 34a and 34b, capacitors 35a and 35b, and resistors 36a and 36b. The electronic circuit 33b is switched from the plug-in mode to the regular mode 0.1 ms later than the electronic circuit 33a. This successfully reduces the variation of a power source current I2 shown in FIG. 4 in the event of mode switching. If desired, the electronic circuit 33, of FIG. 7, may be further divided into three or more in order to further reduce the variation of the power source current I2.

A reference will be made to FIG. 9 for describing a further alternative embodiment of the present invention. As shown, the active plug-in circuit has a resistor 50, a power consumption controller 53, a pin 59, and a pin 60 for mode setting. The pin 59 is mounted on a package connector 56 and plays the same role as the switch 11 shown in FIG. 3.

The pin 59 is connected to a mother board connector 64 later than a power source pin 57 and a ground pin 58 also mounted on the package connector 56. The mode setting pin 60 is mounted on the package connector 56 and plays the same role as the mode setting 12 shown in FIG. 3. The pin 60 is also connected to the mother board connector 64 later than the power source pin 57 and ground pin 58.

In the illustrative embodiment, the interval between the time when the power source pin 57 and ground pin 58 are connected to the terminals of the mother board connector 64 and the time when the pins 59 and 60 are connected to the terminals of the connector 44 is preselected to be longer than the period of time necessary for the power source voltage of an electronic circuit 52 to be substantially stabilized.

The power consumption controller 53 maintains the electronic circuit 52 in the low power consumption mode until a regular mode signal is output to a mode signal line 51 from the pin 60.

The resistor 50 limits a rush current to flow when the power source pin 57 of the package connector is connected to the terminal of the mother board connector 64. In the plug-in mode, i.e., until the regular mode signal appears on the mode signal line 51, the power consumption controller 53 maintains the electronic circuit 52 in the low power consumption mode. Therefore, the resistance of the resistor 50 is lower than that of a resistor 55. As a result, the power source voltage of the electronic circuit 52 rises substantially with the time constant of the resistor 50 and a capacitor 54.

Although the power source voltage of the electronic circuit 52 slightly varies at the time of mode switching, the variation is far smaller than in the conventional active plug-in circuit. Further, although the power source current varies from substantially zero to the current to be consumed in the regular mode, the variation is also far smaller than in the conventional active plug-in circuit.

In summary, in the embodiment shown in FIG. 3, the mode setting 12 selects either the plug-in mode or the regular mode, depending on the power source voltage of the electronic circuit 14. When the mode setting 12 selects the plug-in mode, the power consumption controller 15 reduces the power consumption of the electronic circuit 14. After the power source voltage of the electronic circuit 14 has been stabilized, the mode setting 12 selects the regular mode. This reduces the variation of the power source current to occur when the power source pin 19 of the package connector 18 is connected to the mother board connector and on the transition from the plug-in mode to the regular mode. Consequently, the package connector 18, mother board connector 24 and wirings are free from damage. At the same time, the power source voltage of the device is not influenced at all. In addition, the leakage to the power source circuit and noise ascribable to ground potential are minimized.

Figure 9:
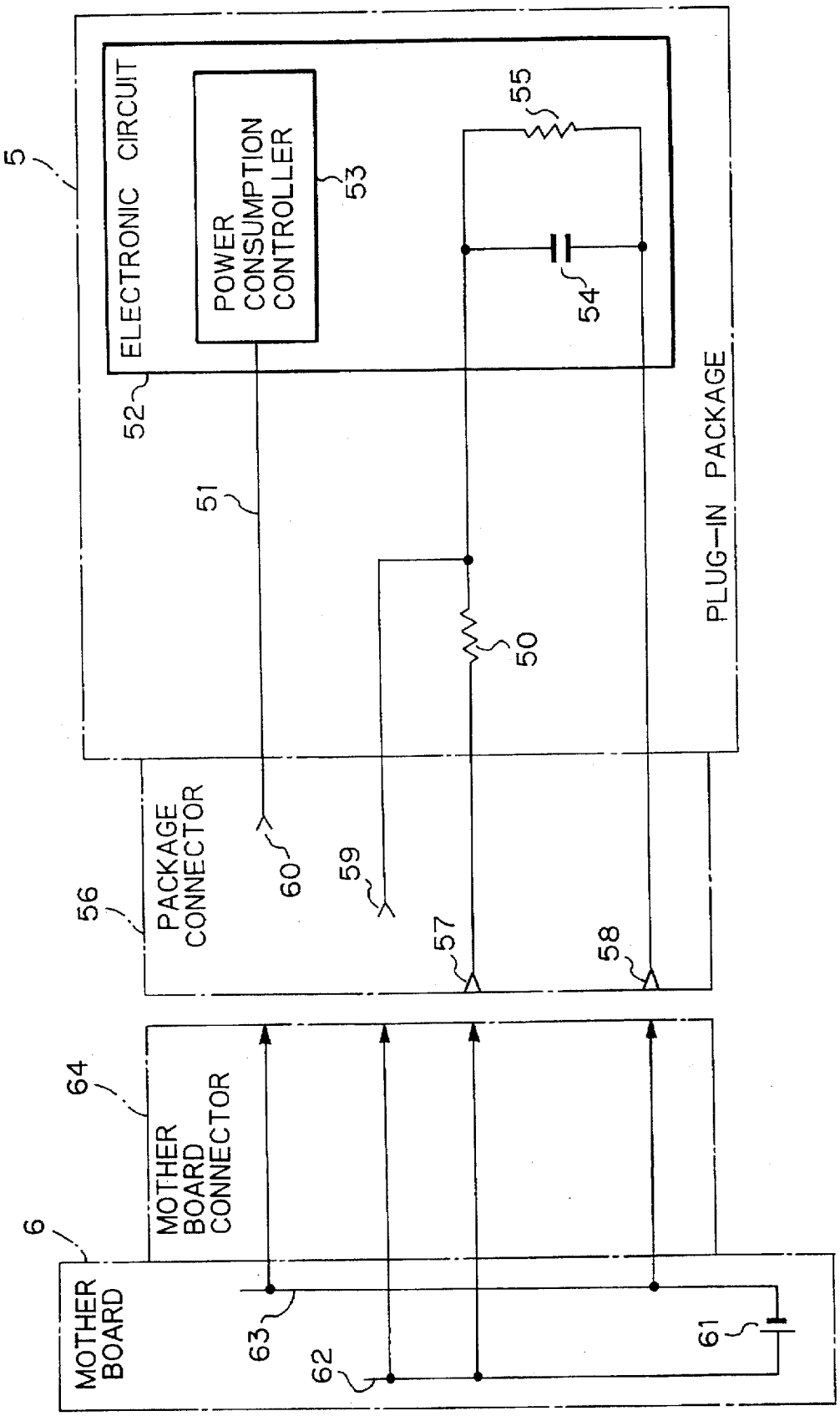

In each of the embodiments shown in FIGS. 7-9, after the pin 39 or 57 of the package connector 37 or 56 has been connected to the corresponding terminal of the mother board connector 44 or 64, the mode setting pin 38 or 60 is connected to the corresponding terminal of the connector 44 or 64. The power consumption controller 34, 34a, 34b or 53 maintains the electronic circuit 33 or 52 in the low power consumption mode until the regular mode signal is input via the pin 38 or 60. After the power source voltage of the electronic circuit 33 or 52 has been stabilized, the regular mode is set up. This also reduces the variation of the power source voltage to occur when the power source pin 39 or 57 is connected to the terminal of the mother board connector 44 or 64 and on the transition from the plug-in mode to the regular mode.

Various modifications will become possible for those skilled in the art after receiving the teachings of the present disclosure without departing from the scope thereof.

What is claimed is:

1. An active plug-in circuit to be plugged into an active apparatus, said active plug-in circuit comprising:

an electronic circuit with a power source terminal;

a connector with a power source pin;

a mode selecting means for selecting one of a plug-in mode and a regular mode, said mode selecting means selecting a mode depending on a power source voltage in said electronic circuit;

a power consumption control means for controlling said electronic circuit to be in a low power consumption mode when said mode selecting means selects said plug-in mode;

a resistor connected between said power source pin of said connector and said power source terminal of said electronic circuit; and switching means for short-circuiting said resistor when said mode selecting means selects said regular mode.

2. An active plug-in circuit as claimed in claim 1, further comprising at least one additional electronic circuit and at least one additional power consumption control circuit, each power consumption control circuit being assigned to an electronic circuit, each electronic circuit having a particular function;

wherein said mode selecting means switches from selection of said plug-in mode to selection of said regular mode on a function basis.

3. An active plug-in circuit to be plugged into an active apparatus, said active plug-in circuit comprising:

a connector with a mode selecting pin and a power source pin mounted on said connector, said mode selecting pin being connected to a corresponding pin of a connector of said active apparatus after said power source pin has been connected to a corresponding pin of said connector of said active apparatus, wherein said mode selecting pin receives a regular mode signal;

a power consumption control means and an electronic circuit with a power source terminal, said power consumption control means controlling said electronic circuit of said package to be in a low power consumption mode until said regular mode signal has been input from said mode selecting pin;

a resistor connected between said power source pin and said power source terminal of said electronic circuit; and a switching means for short-circuiting said resistor when said regular mode signal is input from said mode selecting pin.

4. An active plug-in circuit as claimed in claim 3, further comprising at least one additional electronic circuit and at least one additional power consumption control circuit, each power consumption control circuit being assigned to an electronic circuit, each electronic circuit having a particular function, and wherein said mode selecting means switches from selection of said plug-in mode to selection of said regular mode on a function basis.

5. An active plug-in circuit for connecting a package into an active apparatus, said active plug-in circuit comprising:

an electronic circuit;

a resistor and a switch coupled in parallel;

a mode selecting device coupled to said electronic circuit and to said parallel combination of said resistor and switch; and a connector coupled to said resistor and switch combination and to said mode selecting device;

said mode selecting device transmitting one of a plug-in mode signal and a regular mode signal to said electronic circuit and said switch to select one of a plug-in mode and a regular mode respectively;

said electronic circuit including a power consumption controller;

wherein, said switch short-circuits said resistor when said mode selecting device transmits a regular mode signal; and wherein, said switch opens and said power consumption controller reduces a power consumption of said electronic circuit when said mode selecting device transmits a plug-in mode signal.

6. An active plug-in circuit as claimed in claim 5, wherein:

said connector includes a power source pin coupled to said resistor of said resistor and switch parallel combination; and said electronic circuit includes a power source terminal coupled to said resistor of said resistor switch parallel combination.

7. An active plug-in circuit as claimed in claim 5, wherein said active plug-in circuit further comprises:

at least one additional electronic circuit including a power consumption controller;

each electronic circuit has a particular function; and wherein, said mode selecting device switches from selection of said plug-in mode to selection of said regular mode on a function basis.

8. An active plug-in circuit for connecting a package into an active apparatus, said active plug-in circuit having an electronic circuit, a resistor and a switch coupled in parallel, a mode selecting device coupled to said electronic circuit and to said parallel combination of said resistor and switch, and a connector coupled to said resistor and switch combination and to said mode selecting device, wherein the improvement comprises:

said mode selecting device being capable of transmitting one of a plug-in mode signal and a regular mode signal to said electronic circuit and said switch to select one of a plug-in mode and a regular mode; and said electronic circuit including a power consumption controller; wherein, said switch short-circuits said resistor when said mode selecting device transmits a regular mode signal; and wherein, said switch opens and said power consumption controller reduces a power consumption of said electronic circuit when said mode selecting device transmits a plug-in mode signal.

9. An active plug-in circuit as claimed in claim 1, further comprising at least one additional electronic circuit and at least one additional power consumption control circuit, each power consumption control circuit being assigned to an electronic circuit;

wherein said mode selecting means switches from selection of said plug-in mode to selection of said regular mode for each electronic circuit at a time different from a time when said mode selecting means switches from selection of said plug-in mode to selection of said regular mode for each additional electronic circuit.

10. An active plug-in circuit as claimed in claim 3, further comprising at least one additional electronic circuit and at least one additional power consumption control circuit, each power consumption control circuit being assigned to an electronic circuit;

wherein said mode selecting means switches from selection of said plug-in mode to selection of said regular mode for each electronic circuit at a time different from a time when said mode selecting means switches from selection of said plug-in mode to selection of said regular mode for each additional electronic circuit.

* * * * *